United States Patent [19]

Borras et al.

[11] Patent Number: 5,715,240
[45] Date of Patent: Feb. 3, 1998

[54] COMMUNICATION DEVICE CAPABLE OF ESTIMATING SIGNAL QUALITY WITHOUT SYNCHRONIZATION PATTERN

[75] Inventors: Jaime A. Borras, Hialeah, Fla.; Steven C. Jasper, Hoffman Estates; James P. Michels, Elk Grove, both of Ill.; Troy J. Beukema, Lake Peekskill, N.Y.

[73] Assignee: Motorola, Inc., Schaumburg, Ill.

[21] Appl. No.: 642,548

[22] Filed: May 3, 1996

[51] Int. Cl.$^6$ ............................ H04N 3/06; H04N 3/14
[52] U.S. Cl. ................ 370/252; 370/332; 370/503; 375/354
[58] Field of Search ............................ 370/252, 332, 370/333, 331, 336, 337, 328, 280, 279, 277, 345, 347, 503, 516, 915; 375/224, 227, 354–357, 209

[56] References Cited

U.S. PATENT DOCUMENTS

| | | |
|---|---|---|
| 5,406,588 | 4/1995 | Birchler et al. ........................ 375/346 |
| 5,440,582 | 8/1995 | Birchler et al. ........................ 375/227 |
| 5,469,465 | 11/1995 | Birchler et al. ........................ 375/346 |

*Primary Examiner*—Benedict V. Safourek
*Assistant Examiner*—Matthew C. Phillips
*Attorney, Agent, or Firm*—M. Mansour Ghomeshi

[57] ABSTRACT

A method determines the signal usability of an adjacent channel in a multi-cell communication system without the aid of synchronization symbols. In general, a three step search is used to arrive at the adjacent channel signal quality. The first step is a coarse timing phase search. This is accomplished through a signal quality estimates (606). The second step arrives at the optimum time phase by first interpolating (608) the received signal around the time phase selected in the first step to generate additional samples. After the interpolation (608), signal quality estimates are calculated (610) for the time phases immediately surrounding the time phase found in the first step. The optimum time phase corresponds to the maximum of these quality estimates. Finally, in the third step, the signal quality estimate is calculated for the optimum time phase. This provides the adjacent channel signal quality estimate desired.

9 Claims, 6 Drawing Sheets

COMMUNICATION DEVICE CAPABLE OF ESTIMATING SIGNAL QUALITY WITHOUT SYNCHRONIZATION PATTERN

TECHNICAL FIELD

This invention is generally related to communication devices and more particularly to communication devices operating in a communication system having reusable communication resources.

BACKGROUND

Communication systems that geographically reuse communication resources are known. These systems allocate a predetermined set of communication resources in one geographic area and reuse the same set of communication resources in one or more other geographic areas. This reuse technique improves communication capacity by minimizing the number of communication resources necessary to provide communication service in a large geographic area comprised of several smaller geographic areas. As is also known, a communication resource may be a frequency carrier, a pair of frequency carriers, a time slot in a time division multiplex (TDM) time frame, or any radio frequency (RF) transmission medium.

Two of the most common communication systems which geographically reuse communication resources are cellular communication systems and trunked mobile communication systems. In both communication systems, allocation of a communication resource begins when a communication unit requests communication service. Based on resource availability and signal usability, a resource controller assigns the communication resource to the communication unit. A communication, such as a conversation or a facsimile transmission, occurs on the communication resource between the communication unit and another communication unit or between the communication unit and a subscriber to a public service telephone network. The communication continues until completion or an interruption in service occurs. Upon conclusion of the communication, the resource controller retrieves the communication resource; thus making the communication resource available for another communication.

An important parameter in identifying an acceptable communication resource is signal usability. In a wireless communication system, the communication resources are typically RF channels which occupy predetermined bandwidths. When information signals are transmitted on the RF channels, undesired channel effects, such as fading and interference, alter the information signals during transmission. Thus, the information signals received by a receiver in the communication unit, or a base station, are corrupted by the undesired channel effects. By ascertaining an indication of the corruption on available communication resources, the least corrupted communication resource may be selected for the communication. This indication of corruption is known as signal usability.

In geographic reuse communication systems, signal usability is typically limited by the quantity of co-channel interference present on the RF channel. Co-channel interference occurs when receivers receive unwanted information signals from neighboring communication units, or base stations, transmitting on the same channel as the desired RF channel. Thus, the signal usability decreases as the co-channel interference increases.

Received signal strength indication (RSSI) and bit error rate (BER) are two common methods of estimating signal usability. In an RSSI estimate, the receiver measures the level of a received signal on the desired RF channel. This measurement provides a summation of signal levels (i.e. C+I+N) including the desired information signal (C), the co-channel interference (I), and the noise (N) on the desired RF channel. Although this technique accurately estimates the level of the received signal, it can not distinguish between the desired information signal and signals due to co-channel interference. Thus, an acceptable RSSI measurement may provide unacceptable signal usability due to a high level of co-channel interference. Alternatively, BER measurements provide accurate estimates of signal usability, but in geographic areas where error rates are low, multiple measurements and excessive averaging times may be required to obtain the accurate estimates. Measurement periods as long as ten to fifty seconds may be necessary to obtain accurate BER data.

As briefly mentioned above, fading is an additional undesired channel effect that may alter the transmitted information signal. Fading occurs due to multiple reflections of the desired information signal during transmission over the RF channel. These reflections are typically caused by unintentional reflecting of the transmitted information signal from obstacles in its path, such as buildings and mountains, and may produce multiple modified replications of the transmitted information signal, each introducing various amplitude and phase alterations of the original signal in each new signal path. All of the transmitted information signal replicas form a composite information signal at the input to a receiver. The signal usability of the composite signal is dependent on the type of fading.

Extensive advancements have been made in estimating and measuring signal quality. Some such advances are documented in U.S. Pat. No. 5,440,582 entitled "Method and Apparatus for Determining Signal Usability", U.S. Pat. Nos. 5,406,588 and 5,469,465 both entitled "Method and Apparatus for Mitigating Distortion Effects in the Determination of Signal Usability", and U.S. Pat. No. 5,170,413 entitled "Control Strategy for Reuse System Assignments and Hand-off" all assigned to Motorola Inc. While these technologies provide many advantages, they do not address the technological concern of estimating signal usability in systems where signal synchronization is not available.

Therefore, a need exists for a method and apparatus that determine signal usability in the absence of synchronization information.

DETAILED DESCRIPTION OF THE PREFERRED EMBODIMENT

A communication device operating in a cellular-type communication system monitors the signal usability of potential handover candidates by developing Signal Quality Estimates (SQE) thereof. The SQE's of alternative, or neighbor cell, channels (as well as the serving channel) should be measured in order to allow the communication device to make intelligent evaluations as to preferred handover targets, in the event that the usability of the current serving cell's signal degrades below the desired threshold. Signal usability monitoring of both the forward (base-to-mobile) and reverse (mobile-to-base) links is desirable for best system performance, since the Signal-to-Interference+Noise (S/I+N) ratios experienced by the two links may be dissimilar. The present invention is directed, in particular, toward the problem of signal quality monitoring of the forward link (i.e, by the mobile device).

In a digital environment, SQE determination can be accomplished by first synchronizing to the signal being measured and then evaluating its quality. Establishment of proper symbol synchronization or timing is necessary since incorrect timing can produce a form of self-distortion known as intersymbol interference (ISI), which in turn produces an artificially low SQE indication. Synchronization is most readily accomplished via reception of an explicit synchronization sequence. In many digital communication systems, such synchronization sequences or patterns are transmitted periodically, along with the information-bearing symbols, in order to facilitate establishment of symbol timing (and perhaps also channel estimation) at the receiving end.

While synchronization sequences are desirable in establishing timing for optimum detection, their availability may not always be guaranteed at reception time. This is particularly true in the case of Time Division Multiplex (TDM) systems employing Time Division Duplex (TDD). In such systems, full duplex communication is provided without the need for radio frequency duplexing filters in the mobile subscriber devices. This is accomplished by offsetting the base-to-mobile and mobile-to-base timing such that the need for simultaneous transmission and reception by mobiles is avoided, as depicted in FIG. 5.

Figure 5:
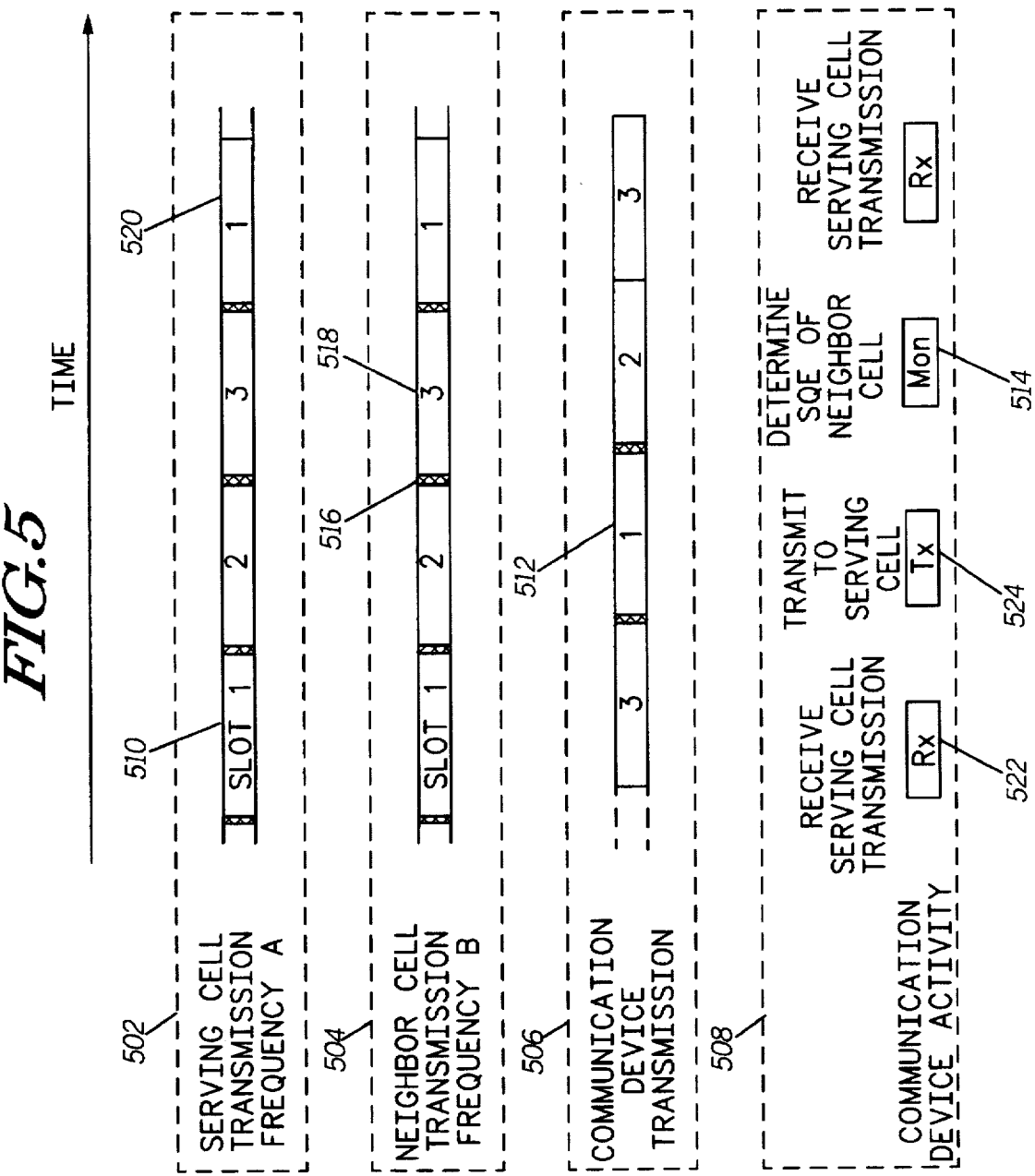
FIG. 5 shows a timing diagram of a communication device in accordance with the present invention.

FIG. 5 shows an exemplary timing diagram 500 for a mobile communication device operating in a TDM system employing TDD. In this example, the TDM multiplex ratio is three. This provides three time slots by which base station transceivers can each service three communication devices. The communication device in diagram 500 receives the serving cell transmissions 510 and 520 as noted in the communication device activity frame structure 508. Neighbor cell signal quality estimation provides the communication device an indicia of the neighbor cell signal usability. The time of the neighbor cell SQE calculation 514 along with the serving cell transmission frame structure 502, neighbor cell transmission frame structure 504, and communication device transmission frame structure 506 are determined by the time division duplex (TDD) constraint, hardware imposed timing constraint, and the TDM multiplex ratio.

The TDD constraint requires that the time at which the communication device receives not coincide with the time at which is transmits. In diagram 500, the communication device receives the serving cell transmission in slot 1, 510, of the serving cell transmission frame structure 502 as noted by 522 in the communication device activity frame structure 508. Next, the communication device transmits 524 to the serving cell in slot 1, 512, of the communication device transmission frame structure 506. Then, the communication device receives the neighbor cell transmission 518 and determines the neighbor cell SQE 514. In each case, the communication device exclusively transmits or receives.

The hardware imposed timing constraint includes the time required by the communication device to switch both from transmitting to receiving, and from receiving to transmitting modes. This includes the time required by a frequency synthesizer to switch frequencies, the time required by the power amplifier to reach an operational state, among others. Thus the time available for neighbor cell signal usability evaluation is further limited.

A method and apparatus exists to determine neighbor cell signal quality when the TDM structure as determined by the above stated constraints is such that the time of the SQE calculation 514 is inclusive of the synchronization symbols 516 in the neighbor cell 518 being monitored. In general, this method and apparatus consists of switching to the neighbor cell frequency, acquiring synchronization with the synchronization symbols 516, and calculating a signal quality estimate. The present invention provides a method of determining neighbor cell signal quality when the time of the SQE calculation 514 is exclusive of the synchronization symbols 516 in the neighbor cell 518 being monitored.

As can be seen from the previous discussion, the use of TDD, while providing cost and weight savings, limits the time available for a mobile transceiver to monitor neighbor cell transmissions. Consequently, the need exists to provide a method of estimating neighbor cell signal quality without the benefit of explicit synchronization.

To better understand the details of the present invention it is useful to discuss briefly an exemplary embodiment of the SQE itself. (More detail can be found in U.S. Pat. No. 5,440,582 entitled "Method and Apparatus for Determining Signal Usability", U.S. Pat. Nos. 5,406,588 and 5,469,465 both entitled "Method and Apparatus for Mitigating Distortion Effects in the Determination of Signal Usability", and U.S. Pat. No. 5,170,413 entitled "Control Strategy for Reuse System Assignments and Hand-off" all assigned to Motorola Inc.) In the following it is assumed that complex-baseband samples at the output of the receiver demodulator are available, at a sampling rate equal to the symbol rate. These received samples can be modeled mathematically as:

$$r_i = d_i h_i + u_i + z_i,$$

where:

$r_i$ is the ith received symbol sample, $d_i$ is the transmitted data symbol (e.g., QPSK or 16QAM)

$h_i$ is the complex channel gain (comprising attenuation and phase effects)

$u_i$ comprises co-channel interference and noise $z_i$ is modem self-distortion (e.g., due to ISI, filter imperfections, etc.)

Estimation of signal quality can be performed by first obtaining estimates $\underline{d}_i$ and $\underline{h}_i$ of $d_i$ and $h_i$, respectively, and forming an estimate of interference plus noise according to $$\underline{u}_i = r_i - \underline{d}_i \underline{h}_i$$

In this expression the term $\underline{d}_i \underline{h}_i$ can be seen to be an estimate of the desired signal portion of the total received signal. In practice, estimates $\underline{d}_i$ and $\underline{h}_i$ can be obtained through the use of pilot, or reference, symbols interleaved with the data symbols. (See, for example, J. K. Cavers, "An analysis of pilot symbol assisted modulation for rayleigh fading channels," *IEEE Transactions on Vehicular Technology*, vol. 40, pp. 686–693, November 1991.)

Estimates of the Signal and Interference-plus-Noise powers can then be found by averaging the squared-magnitudes of the respective sampled components:

$\underline{S} = E\{|\underline{d}_i \underline{h}_i|^2\}; \underline{I+N} = E\{|\underline{u}_i|^2\},$ where $E\{.\}$ denotes expectation or average over some set or subset of symbols.

Finally, the SQE is defined as $\underline{S}/\underline{I+N}$. This measure will reflect the true S/I+N to the extent that $d_i$ and $h_i$ are accurately estimated, and to the extent that $z_i$ are minimized. Since synchronization errors cause the distortion components $z_i$, as well as the $d_i$ and $h_i$ estimation errors to increase, it is expected that the SQE result will be maximum at the optimum symbol timing phase. Such behavior can be exploited to obtain timing information in the absence of an explicit synchronization sequence, as will now be explained.

The present invention relies on a three step search to arrive at the neighbor cell signal quality estimate. The first step performs a coarse timing phase search using received samples to produce a coarse timing phase estimate. The second step performs a fine timing phase search using interpolated received samples to produce a fine timing estimate. This is accomplished by first interpolating the received samples to produce additional samples corresponding to additional timing phases near the coarse timing phase estimate. Then a fine timing phase search is performed on the additional samples using additional SQE calculations, to produce a fine timing phase estimate. The third step performs a final SQE calculation corresponding to the fine timing phase estimate. The result of this calculation is the desired neighbor cell signal quality estimate.

Figure 1:
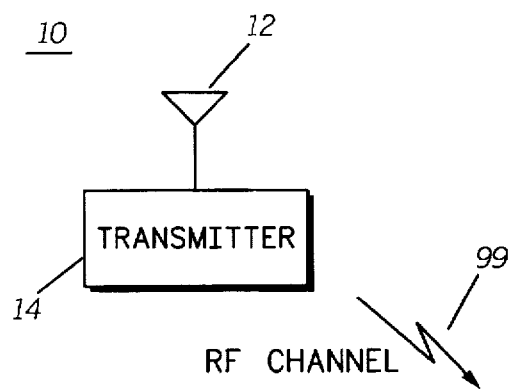
FIG. 1 shows a block diagram of a communication system in accordance with the present invention.
Figure 1:
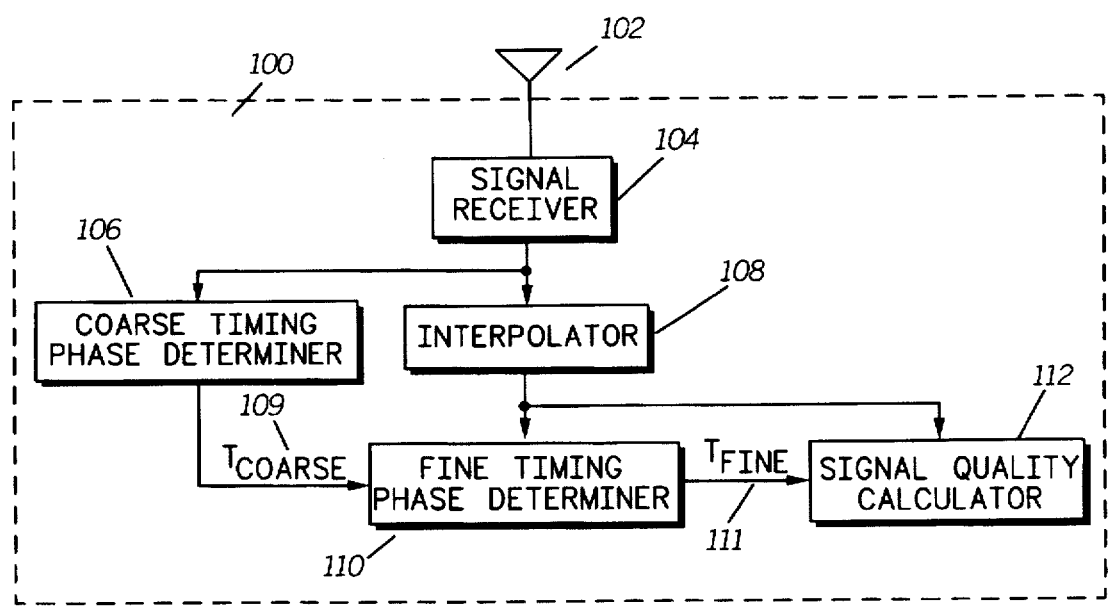

To better understand the details of the present invention reference is made to a series of drawings where like reference numerals are carried forward. Reference is first made to FIG. 1 where elements of a communication system 10 in accordance with the present invention are shown. The communication system 10 includes a number of communication devices and a number of central stations. The central stations provide for the inter-communication between the several communication devices. Similarly communication between these devices and other devices not contained in the system 10 are handled via these central stations.

In general, a transmitter 14 transmits a Time Division Multiple Access (TDMA) signal via an antenna 12. The transmitter 14 may be part of a central station or part of a communication device. This signal is picked up by an antenna 102 of a receiver 100. The receiver 100 includes a signal receiver 104 which comprises the radio frequency, analog-to-digital conversion, and digital signal processing circuitry required to convert the received radio frequency signal from an analog waveform to a set of discrete signal samples. This signal receiver 104 produces demodulated (complex-baseband) received samples which are coupled to an interpolator 108. The sampling rate of the sample set produced by receiver 104 should be higher than the symbol rate. For example, a sampling rate of 2 or 3 samples per symbol may be used. Interpolator 108 produces additional samples corresponding to an even higher sampling rate, for example 6 or 8 samples per symbol.

The received samples produced by receiver 104 are also coupled to a coarse timing phase determiner 106. Utilizing the received samples, the timing phase determiner 106 performs a coarse timing phase search to produce a coarse timing phase estimate. To accomplish this, the determiner 106 utilizes the received samples to compute a coarse timing metric for each of the timing phases in the coarse search space. It then selects the best coarse timing phase on the basis of comparing the coarse timing metrics. Coarse timing phase estimate 109 is thus generated by determiner 106 which corresponds to the maximum of the coarse timing metrics calculated.

Various methods exist for arriving at the coarse timing metrics. In alternative embodiments of the present invention, partial or full SQE calculations may be used to produce the metrics. A partial SQE calculation is defined as utilizing a select subset of information symbols which is less in number than the total number of symbols available within the neighbor cell monitor interval 514. The number of information symbols used for a partial SQE calculation may be variable. A full SQE calculation is defined as utilizing all of the information symbols available in neighbor cell monitor interval 514. Partial SQE calculations result in less accurate SQE determination but allow for a reduction in processing complexity.

The coarse timing phase estimate along with output from the interpolator 108 are coupled to a fine timing phase determiner 110. This determiner produces a fine timing phase estimate 111 which is coupled to a signal quality calculator 112 along with output from the interpolator 108. The calculator 112 produces the final SQE result which provides indicia of the usability of neighbor cell signals. Signal quality calculator 112 preferably uses all the available information symbols present in neighbor cell monitor interval 514, for most accurate results In accordance with the preferred embodiment of the present invention, a significant portion of the relevant elements of the receiver 100 may be realized via a digital signal processing (DSP) unit. This DSP unit will include software routines which function as the coarse timing phase determiner 106, the interpolator 108, the fine timing phase determiner 110, and the signal quality calculator 112.

Figure 2:
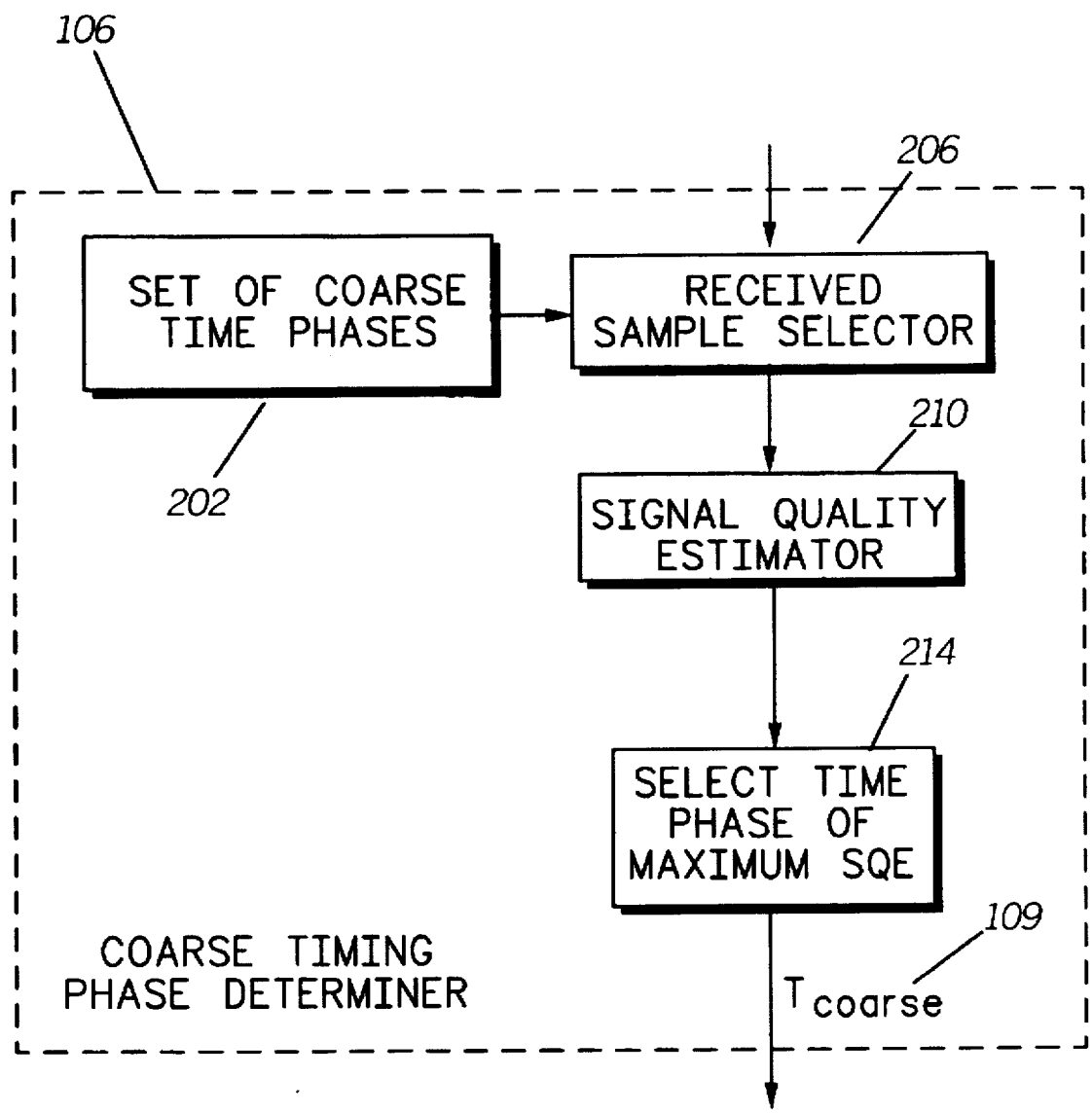
FIG. 2 shows elements of a communication device in accordance with the present invention.

Referring to FIG. 2, elements of the coarse timing phase determiner 106 are shown in accordance with the present invention. The output of the receiver 104 is routed to received sample selector 206. Selector 206 selects the received sample subsets from signal receiver 104 which correspond to the plurality of coarse time phases to be searched. Signal quality estimator 210 estimates the signal quality by calculating an SQE value for each of the coarse time phases. Estimator 210 may employ either partial or full SQE calculations, as required by complexity and performance considerations. The time phase associated with the maximum SQE is selected via selector 214. The output of this selector 214 provides a coarse search time phase ($T_{coarse}$) 109 to be routed to the fine timing phase determiner 110.

Figure 3:
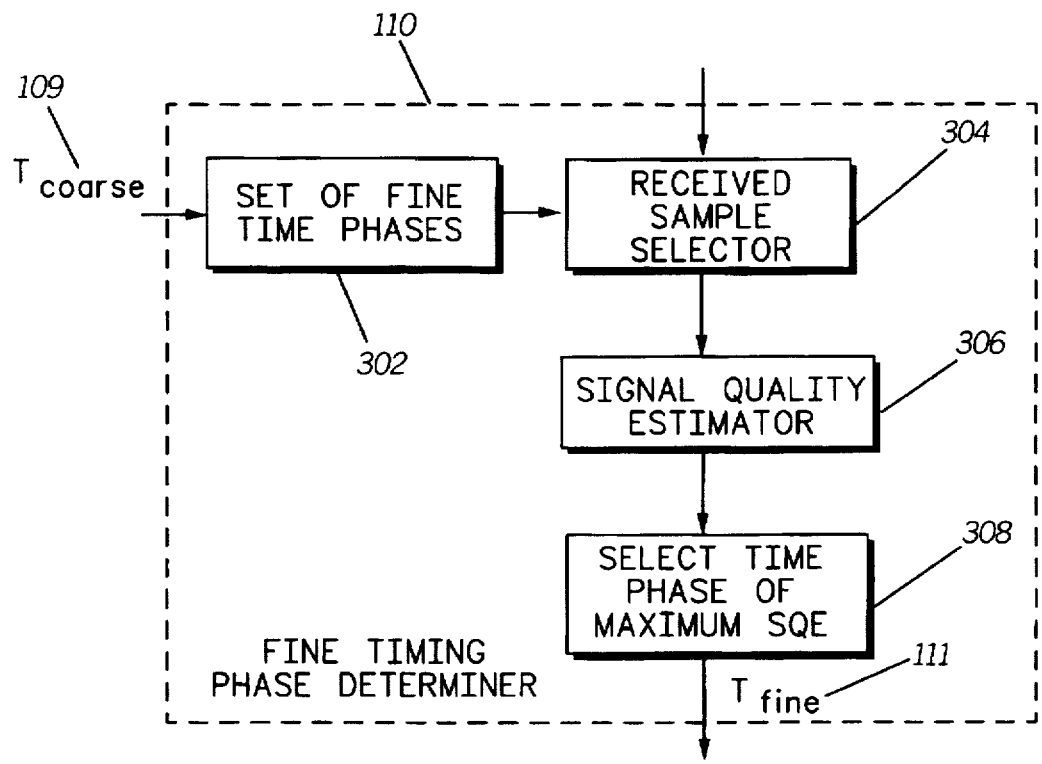
FIG. 3 shows additional elements of a communication device in accordance with the present invention.

Referring to FIG. 3, the elements of the fine timing phase determiner 110 are shown in accordance with the present invention. The coarse search time phase 109 is coupled to block 302 where additional (fine) timing phases near $T_{coarse}$ are obtained. These fine timing phases are coupled to a data selector 304 which also receives interpolated received sample sets from the interpolator 108. Once again, the selector 304 selects the received sample subsets from the signal receiver (through the interpolator 108) corresponding to the plurality of fine timing phases as specified in 302. A signal quality estimator 306 estimates the signal quality by calculating an SQE value for each in the plurality of fine timing phases. Similarly to the case for signal quality estimator 210, estimator 306 may employ either partial or full SQE calculations. The time phase associated with the maximum SQE is selected via selector 308. The output of this selector 308 provides a fine search time phase ($T_{fine}$) 111 to be routed to the signal quality calculator 112.

Figure 4:
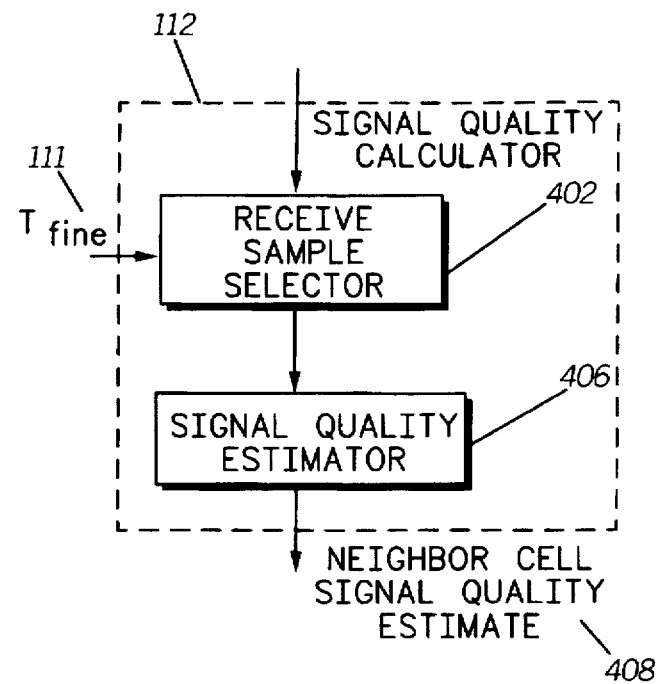
FIG. 4 shows additional elements of a communication device in accordance with the present invention.

Referring to FIG. 4, the details of the signal quality calculator 112 in accordance with the present invention are shown. The fine search time phase ($T_{fine}$) 111 is submitted to a selector 402 which also receives interpolated received sample sets from the interpolator 108. Selector 402 selects the received samples from the interpolator 108 corresponding to the time phase of interest ($T_{fine}$) 111. A signal quality estimator 406 receives the data from the selector 402 and produces the final SQE value 408. Signal quality estimator 406 preferably utilizes a full SQE calculation, for most accurate results. This SQE value is used to determine if an neighbor cell channel is available or otherwise usable. Higher SQE values indicate better signal usability. Consequently, the receiver 100 may move to a neighbor cell channel with the highest SQE based on this calculation and without the benefit of synchronization signals.

Figure 7:
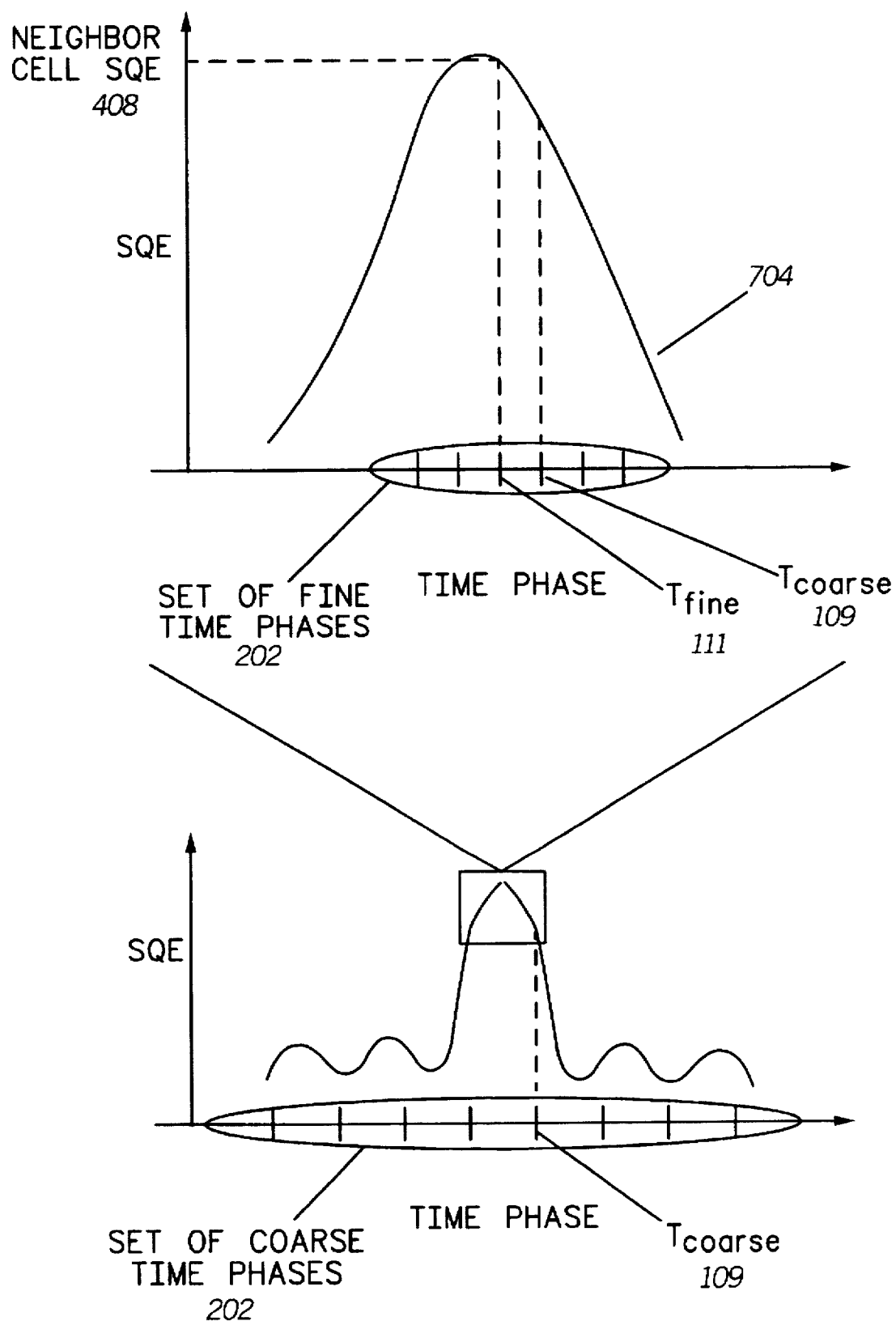
FIG. 7 shows an illustrative diagram of the relationship between timing and signal usability, in accordance with the present invention.

FIG. 7 illustrates the qualitative behavior of the SQE as a function of timing phase in the context of the present invention. Curve 702 presents a global view of the relationship between timing phase and SQE, if continuously variable timing phase were available. The SQE can be seen to achieve a maximum value at what is presumably the optimum timing phase. Calculation of full or partial SQE values at the coarse search timing phase set 202 allows a rough timing phase estimate 109 (Tcoarse) to be obtained. Curve 704 presents an expanded view near the optimum timing phase. Further, SQE estimates at the set 302 of fine timing phases near Tcoarse allow for a more accurate timing phase estimate 111 ($T_{fine}$) to be obtained. The SQE value 408 corresponding to timing phase $T_{fine}$ provides a close approximation to the true SQE.

Figure 6:
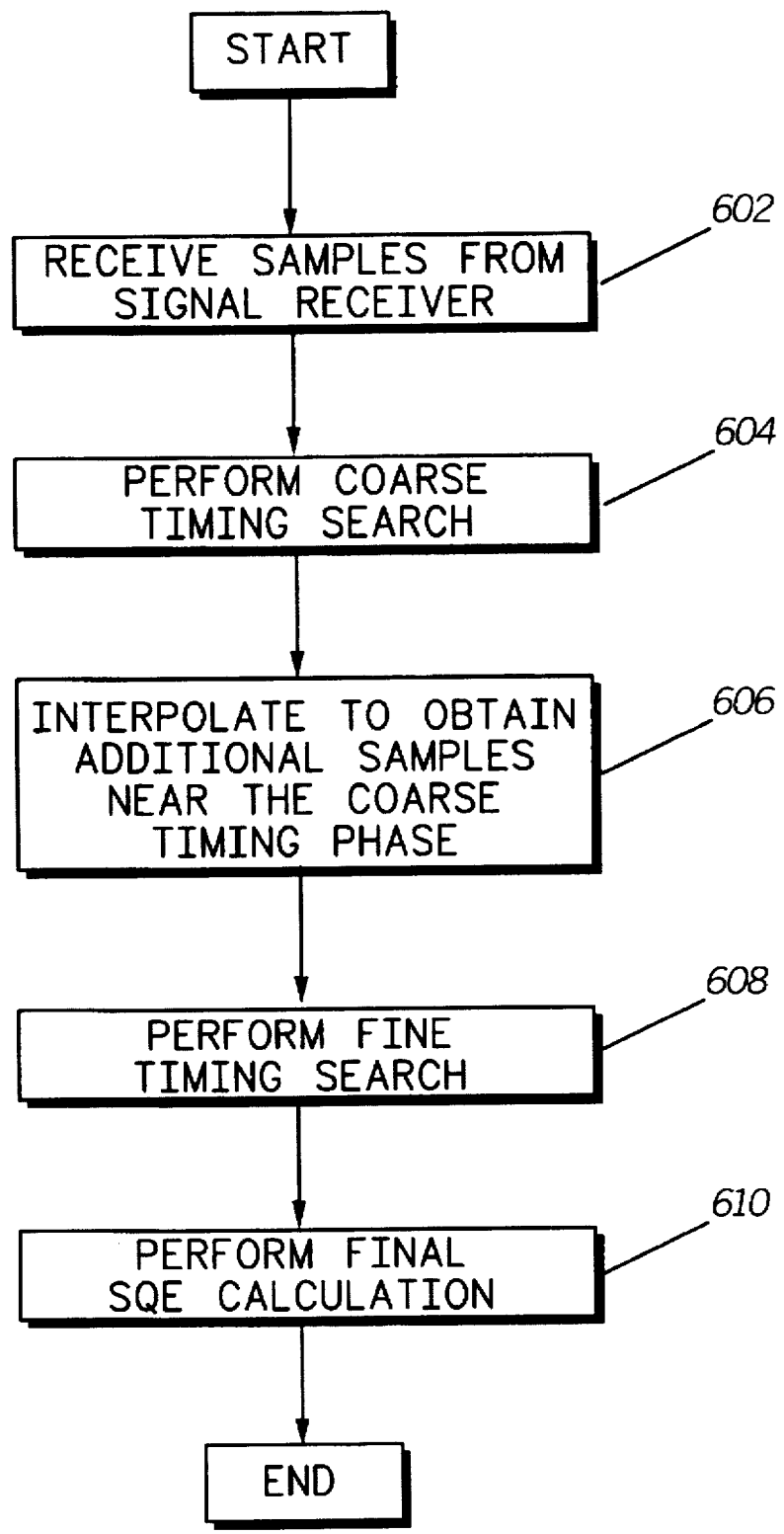
FIG. 6 shows a flow diagram of the operation of a communication device in accordance with the present invention.

FIG. 6 shows a flow diagram of the operation of the communication device in accordance with the present invention. After a start block, samples are received from the signal receiver 104, step 602. At step 604, the samples from step 602 are coarse searched 106 to determine a coarse timing phase estimate 109. At step 606, the samples from the signal receiver 104 are interpolated 108 to generate additional samples corresponding to additional time phases near the coarse timing phase estimate 109 of step 604. At step 608, the samples from step 606 are fine search 110 to generate a fine timing phase estimate 111. At step 610, the signal quality calculator 112 produces a neighbor cell signal quality estimate for the fine timing estimate 111 determined in step 608. The neighbor cell signal quality estimate provides an indicia of the neighbor cell signal usability.

Significant distinctions exist between the present invention and the existing prior art. The present invention provides a method and apparatus for determining an indication of received signal usability without the availability of a synchronization pattern. Accurate and rapid evaluation of the usability of a received signal is an important procedure for such system operations as channel assignment and hand-off in a multiple site frequency reuse communication system. With the present invention, the evaluation of signal usability remains possible even when the TDM structure, the use of time division duplex (TDD), and other constraints preclude the reception of synchronization symbols in the channel monitoring window. This independence from the necessity of receiving a synchronization eliminates the need for additional hardware, such as RF duplexing circuitry, hence reducing the overall cost, size and weight of the communication device.

What is claimed is:

1. In a Time Division Multiple Access (TDMA) communication system having a plurality of central stations and a plurality of communication devices, a method for obtaining indicia of signal usability to aid in cell-to-cell handover, comprising the steps of:

demodulating a received signal to produce received samples;

performing a coarse timing phase search using the received samples to produce a coarse timing phase estimate;

interpolating the received samples to produce additional samples corresponding to additional timing phases near the coarse timing phase estimate;

performing a fine timing phase search using the additional samples using Signal Quality Estimates (SQE) calculations to produce a fine timing phase estimate; and calculating a final SQE result corresponding to the optimum timing phase.

2. The method of claim 1, wherein the step of performing a coarse timing phase search includes the steps of:

computing a coarse timing metric for each timing phase to be searched, using the received samples;

selecting a plurality of timing phases on the basis of comparing the coarse timing metrics;

calculating an SQE value for each of the plurality of timing phases, using the received samples; and producing a coarse timing phase estimate corresponding to the maximum of the at least one SQE values.

3. A communication device operating in a communication system having a plurality of channels, comprising:

a receiver for receiving and demodulating a received signal to produce received samples;

a search routine performing a coarse timing phase search using the received samples to produce a coarse timing phase estimate;

an interpolator for interpolating the received samples to produce additional samples corresponding to additional timing phases near the coarse timing phase estimate;

a second search routine for performing a fine timing phase search using the additional samples using Signal Quality Estimates (SQE) calculations to produce a fine timing phase estimate; and a calculator for calculating a final SQE result corresponding to the optimum timing phase.

4. In a communication system having a plurality of communication devices communicating with a plurality of base stations using an operating channel selected from a plurality of channels, a method for rapidly locating an optimum channel adjacent to the operating channel without the benefit of channel synchronization, comprising the steps of:

demodulating a received signal to produce received samples;

performing a coarse search on the received samples using SQE calculations to produce a plurality of coarse timing phases;

selecting optimum timing phases from among the plurality of coarse timing phases having the largest SQE;

performing a fine search to obtain more optimum timing phases using additional SQE calculations; and selecting a timing phase with largest SQE in order to select an adjacent channel.

5. The method of claim 4, wherein the step of performing a coarse search includes searching the received samples using partial SQE calculations.

6. The method of claim 4, wherein the step of performing a coarse search includes searching the received samples using full SQE calculations.

7. The method of claim 4, wherein the step of performing a coarse search includes the step of performing a coarse SQE search.

8. A method for determining channel usability in a TDM system in the absence of synchronization symbols, comprising the steps of:

providing received symbols;

performing a coarse timing search;

selecting the best timing phase from among the plurality of timing phases;

performing a fine search at a higher sampling rate using signal quality estimation calculations; and selecting the largest SQE values in order to determine channel usability.

9. The method of claim 8, wherein the step of performing a coarse timing search includes performing an Signal Quality Estimation.

* * * * *